July 11, 1944.   A. H. RERICK ET AL   2,353,187
TIRE AND WHEEL ASSEMBLY MACHINE
Filed June 19, 1942   3 Sheets-Sheet 1
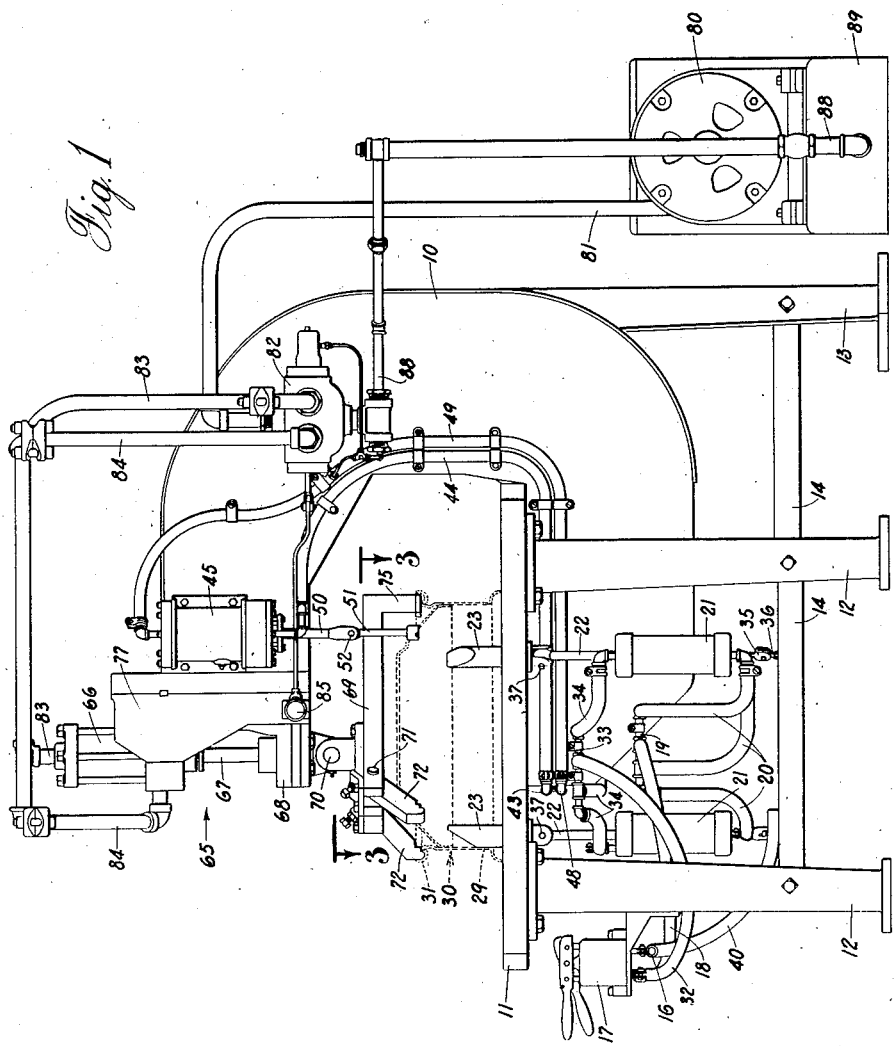
INVENTORS.
Albert H. Rerick and Earl B. Rausch
BY
ATTORNEYS

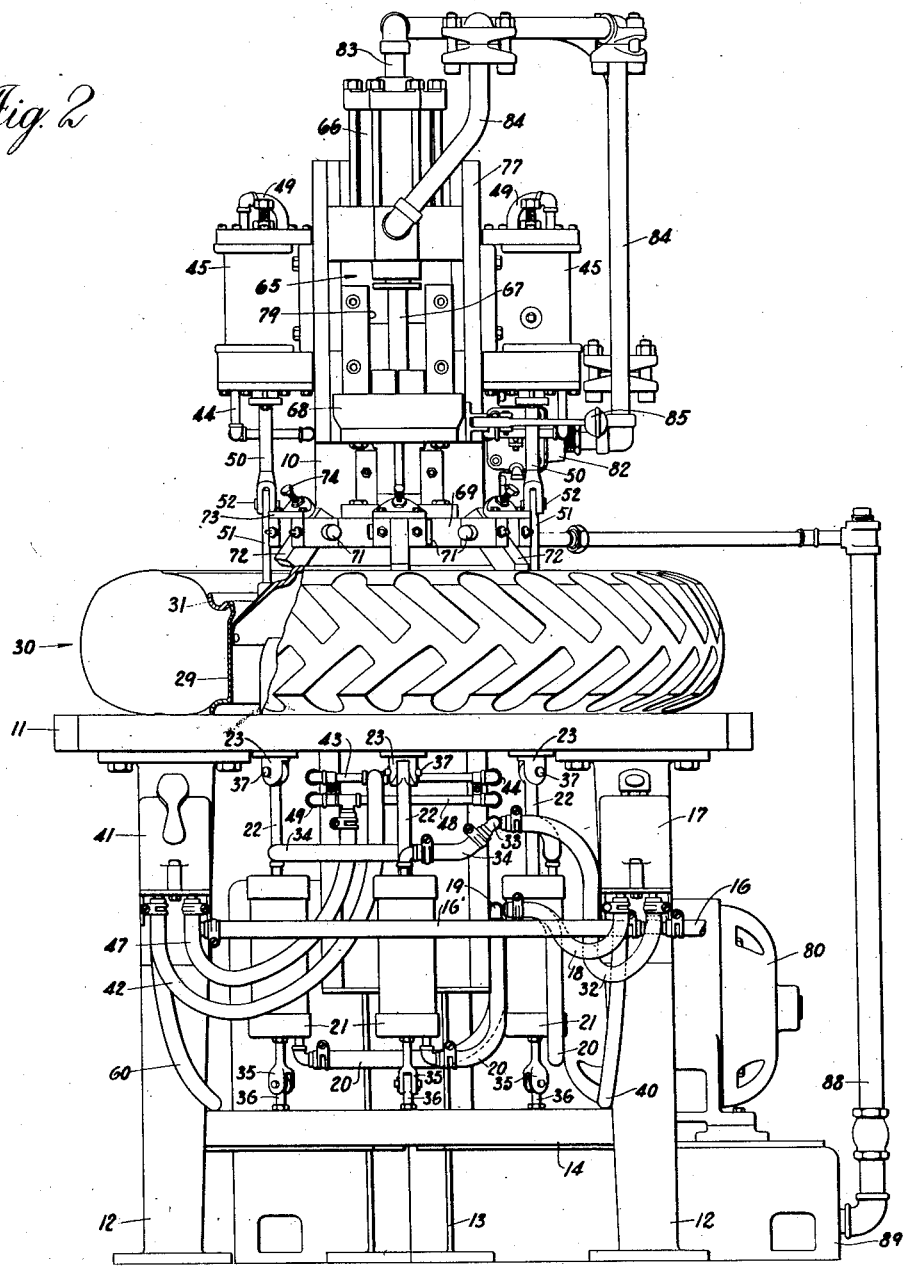

July 11, 1944.  A. H. RERICK ET AL  2,353,187
TIRE AND WHEEL ASSEMBLY MACHINE
Filed June 19, 1942  3 Sheets-Sheet 3
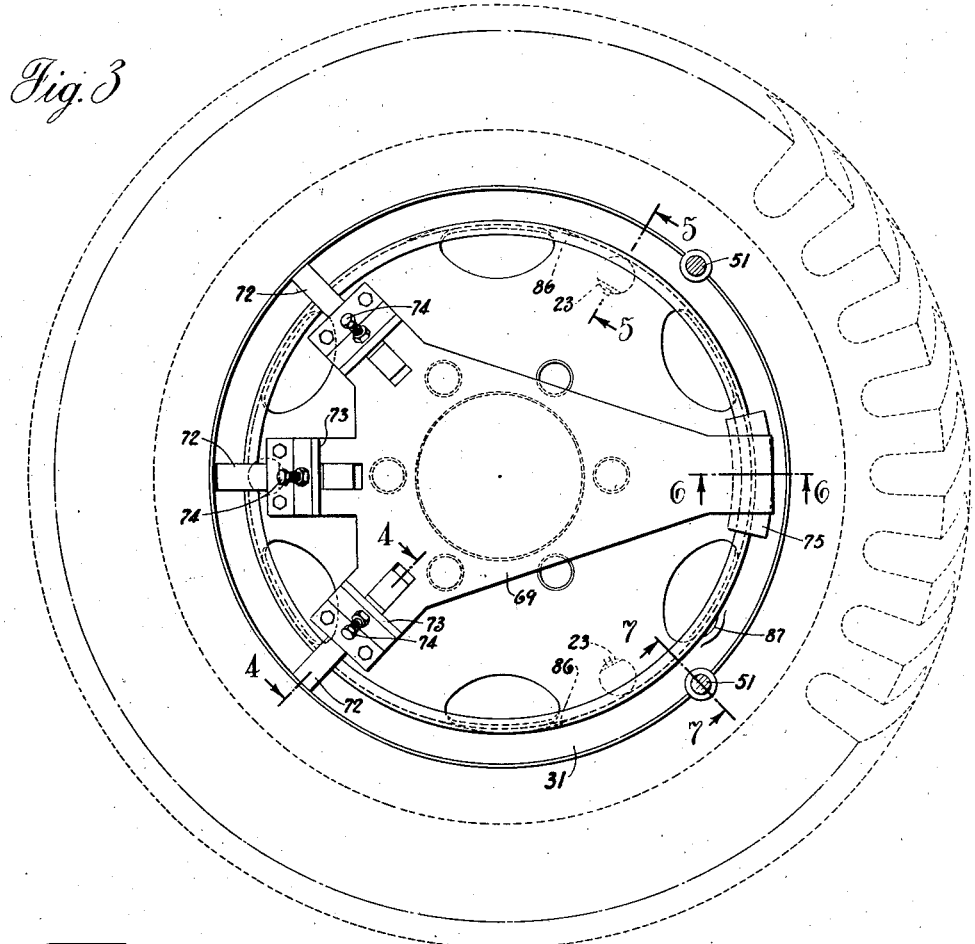
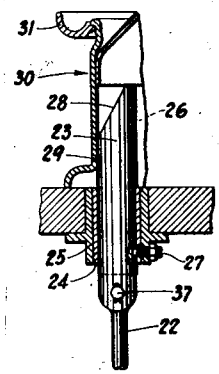
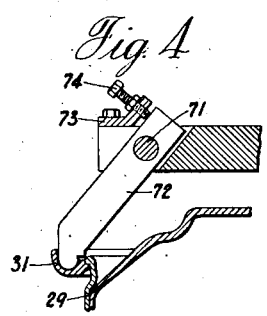
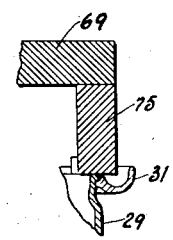
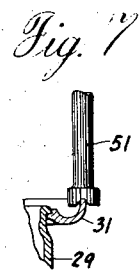
INVENTORS.
Albert H. Rerick and Earl B. Rausch
BY
ATTORNEYS.

Patented July 11, 1944

2,353,187

UNITED STATES PATENT OFFICE 2,353,187

TIRE AND WHEEL ASSEMBLY MACHINE

Albert H. Rerick, South Bend, and Earl B. Rausch, Bremen, Ind., assignors to The Studebaker Corporation, South Bend, Ind., a corporation of Delaware Application June 19, 1942, Serial No. 447,728

9 Claims. (Cl. 29—84)

The present invention relates to a machine for assembling a tire locking ring to the rim of a wheel.

The machine of our invention is particularly adapted for use in assembling an integral annular locking ring to the rim of a wheel for retaining a tire thereon. The type of integral locking rings referred to are generally used with large sized wheels and tires and are exceedingly difficult to assemble manually. While the invention is disclosed with reference to the above specific problem, it will be understood that the apparatus of our invention may be readily adapted for applying other types of locking rings to wheels and may be adapted for other purposes.

So far as we are aware, it is the practice in the art of applying an integral locking ring to the rim of a wheel to lay the wheel, upon which the tire has previously been placed, upon the floor and angle the locking ring so that a portion of it is disposed adjacent a portion of the rim. The portion of the ring in juxtaposition to the rim is then given a sharp, hard blow to fit that portion of the ring over the rim. Thereafter, the remainder of the ring is struck sharp, hard blows to force it over the remainder of the rim. This is difficult manual work and causes rapid fatigue of the workman in assembling the locking rings to the rims. The manual method above described is unsatisfactory for present day mass production methods.

It is the object of our invention to provide a suitable apparatus of simple operation and design for accurately and rapidly assembling a locking ring to the rim of a vehicle.

In the preferred form of our invention herein disclosed the apparatus comprises a frame having a platform for supporting the wheel having a tire thereon to which the locking ring is to be assembled for retaining the tire upon the wheel, it being understood that the tire is placed upon the rim prior to being placed upon the platform of the machine. Preferably, we provide selectively operable means for positioning the wheel upon the platform in a predetermined position with respect to other apparatus referred to hereinafter.

In the embodiment of our invention herein disclosed the rim and locking ring are of a character provided with interengaging shoulders for securing the locking ring to the rim. Suitable means, preferably pneumatically operated, is mounted upon the upper end of the frame and above the platform of the machine for supplying force to a portion of the locking ring to cause it to fit over a portion of the rim. Also, carried upon the upper end of the machine is a second means, preferably hydraulically operated, for forcing the locking ring downwardly with respect to the rim of the wheel and also radially outwardly of the latter to cause the remaining portion of the locking ring to fit over and engage the remainder of the rim to complete the assembly of the ring with the rim.

It will appear that the invention essentially consists of a means for centering the wheel with respect to certain apparatus for initially engaging a portion of the ring with the rim and then completing the engagement of the ring with the rim. In the preferred embodiment of the invention the centering or locating means, and the means for causing the initial engagement of the ring with the rim are pneumatically operated so that these operations may be quickly carried out. Also, as will appear in detail hereinafter, the means for completing the assembly of the locking ring with the rim preferably comprises a hydraulic ram so that a great force may be applied to the ring to expand it and fit it over the rim.

Now, in order to acquaint those skilled in the art with the manner of constructing and operating a machine in accordance with our invention we shall describe in conjunction with the accompanying drawings a preferred embodiment of the invention.

In the drawings:

Figure 1 is a side elevational view of a machine constructed in accordance with our invention;

Figure 2 is a front elevational view of the machine of Figure 1;

Figure 3 is a view taken substantially on line 3—3 of Figure 1, certain parts being omitted for clearness of illustration;

Figure 4 is a vertical detail view taken substantially on line 4—4 of Figure 3;

Figure 5 is a detail vertical sectional view taken substantially on line 5—5 of Figure 3 showing one of the pins for locating the wheel in proper position upon the platform of the machine;

Figure 6 is a detail vertical view taken substantially along the line 6—6 of Figure 3; and Figure 7 is a detail vertical sectional view taken substantially on line 7—7 of Figure 3.

Referring now to Figures 1 and 2, it will be seen that we have provided a C-shaped frame member 10 having a horizontally disposed platform 11 for supporting a wheel having a tire thereon. A plurality of legs 12 extend, one from each corner of the platform 11, for supporting the platform at substantially waist height, and a leg 13 extends from the C-shaped frame at the rear of the machine to the floor. A plurality of angle members 14 of right angular cross-section are secured to the several legs 12 and between the rearmost corner leg 13 at the rear of the machine to provide a rigid support for the same. The bottom of the C-shaped frame 10 and the platform are rigidly secured to each other by any suitable means, such as welding.

An air inlet manifold 16 extending to a valve member 17 is connected to a suitable source of air under pressure, (not shown). A conduit 18 extends from the valve 17 to a secondary manifold 19 from which extends a plurality of conduits 20, one to each of the lower ends of a plurality of cylinders 21. Disposed within each of the cylinders 21 is a piston, (not shown), to which is connected a piston rod 22, as shown in detail in Figure 5, which, at its upper end, is pivotally connected to a centering element or locating plug 23. In the embodiment disclosed three cylinders 21 are provided, and it will be understood that the description of one of them is applicable to all.

The platform 11 has disposed therein a plurality of bushings 24 carried by retainers 25 which are suitably secured in openings provided therefor in the platform 11. It will be understood that a bushing 24 and a retainer 25 is provided for each locating plug 23. Each centering element or locating plug 23 is provided with a longitudinally extending slot 26 which receives the end of a set screw 27 for preventing the plug 23 from rotating relative to the platform 11. The upper ends of the plug 23 are tapered as at 28 so that when the valve 17 is manipulated to admit air under pressure to the cylinders 21 through the conduits above described the piston rods raise the locating plugs 23, the beveled edges 28 being adapted to engage the inner periphery of the rim 29 of the wheel 30 which has been placed upon the platform 11 in order to have the locking ring 31 applied to the rim. Preferably, the several plugs 23 are spaced 60° apart from each other so that the wheel 30 and the ring 31 may be positioned upon the machine in proper relation to certain apparatus carried at the upper end of the C-shaped frame which will be described more in detail hereinafter.

Air under pressure is adapted to be conducted to the upper ends of the several cylinders 21 by means of a conduit 32 extending from the valve 17 to a secondary manifold 33 from which, in turn, a plurality of conduits 34 extend to the upper ends of the several cylinders 21. The valve 17 is of a character well known in the art and is of the type adapted to be manipulated to admit air to the upper ends of the cylinders 21 for lowering the plugs 23, or to admit air to the lower ends of the cylinders 21 to raise the plugs 23. It will be understood that as air is admitted into the lower ends of the cylinders 21 air is exhausted from the upper ends of the cylinders through the conduits above described for admitting the air under pressure thereto, and likewise, as air under pressure is admitted to the upper ends of the cylinders air below the pistons is discharged through the conduits for conducting air under pressure thereto to the valve 17. An exhaust conduit 40 extends from the valve 17 and is adapted to conduct the air exhausted alternately from opposite ends of the pistons in the cylinders. Valves of the character referred to are well known in the art, and consequently need not be further illustrated or described for an understanding of our invention.

Referring more particularly to Figure 2, it will be seen that each cylinder 21 has a clevis 35 extending from the lower end thereof which is pivoted to an eye 36 carried by certain of the brace members 14. Each rod 22 is pivotally connected at 37 to its associated plug 23 and together with the clevis 35 and eye 36 above described permit limited rocking movement of the cylinders 21 when air under pressure is admitted thereto to permit the plugs 23 to assume accurately aligned positions with respect to their associated bushings 24.

An extension 16' of the air inlet manifold 16 extends transversely forwardly of the machine to a valve 41 which is of the same type as the valve 17 above described. A conduit 42 extends from the valve 41 to a secondary supply manifold 43 from which extends a pair of conduits 44, one along each side of the C-shaped frame 10. Each conduit 44 extends to the bottom of a cylinder 45, one being disposed on each side of the upper end of the C-shaped frame 10. Also extending from the valve 41 is a conduit 47 which leads to a secondary manifold 48 having a pair of conduits 49 extending therefrom, one on either side of the frame member 10, to the upper end of each cylinder 45. The cylinders 45 are of known construction and comprise a piston operable therein having a piston rod 50 extending outwardly of the cylinder 45 from the lower end thereof. A rod 51 is pivotally connected to the piston rod 50 as at 52, each rod 51 being provided with an enlarged head having an arcuate V-shaped groove in the end thereof adapted to engage the outer periphery or edge of the ring 31.

The valve 41 is adapted to be actuated to cause the rods 51 to be moved downwardly so that the heads thereof engage the ring 31 to cause a portion of the interengaging elements of the rim 29 and the locking ring 31 to become engaged preliminary to final assembly of the locking ring to the rim. It will be understood that the valve 41 is of a character which may be manipulated to admit air under pressure from the extension 16' of the air supply manifold to the conduit 47, thence through the secondary air manifold 48, thence through the conduits 49 to the upper ends of each of the cylinders 45 to lower the rods 51 and thereby cause partial engagement of the locking ring with the rim as referred to above. After this operation has been completed the valve 41 may be manipulated to admit air under pressure from the air supply manifold 16' to the conduit 42, to the secondary air supply manifold 43 and thence through the conduits 44 to the lower end of the cylinders 45 below the pistons therein to raise the rods 51. During the raising movement of the pistons in the cylinders 45 the air above the pistons is exhausted through the conduits 49, the secondary manifold 48, the conduit 47 into the valve 41 and thence discharged to the atmosphere through the exhaust conduit 60. Similarly, when the valve 41 is manipulated to lower the rods 51, air is exhausted from the cylinders below the pistons through the conduits 44, the secondary manifold 43, the conduit 42 through the valve 41 and out to atmosphere through the exhaust conduit 60.

In the above apparatus so far described it will be seen that we have provided means for positioning a rim upon the platform 11 in a predetermined position with respect to the cylinders 45 and the rods 51 carried in the upper end of the C-shaped frame member so that the latter are disposed in a position which, when actuated, will cause partial engagement of the locking ring with the rim of the wheel.

In order to assemble the remainder of the locking ring with the rim of the wheel, we provide a suitable hydraulically operated mechanism 65 which comprises a hydraulic cylinder 66 from which extends a piston rod 67 which is secured to the piston in the cylinder 66. The piston rod 67 extends outwardly of the lower end of the cylinder 66 and is secured to a guide member or gib 68 to the lower end of which a spider 69 is secured by means of a horizontally extending pin 70 providing for pivoted movement of the spider about a horizontal axis.

Referring to Figures 3 and 4, it will be seen that the spider 69 comprises a plurality of radially extending fingers 72 which are pivoted about horizontally extending pins 71 extending transversely of the slots provided in the spider for each pin 72. A plurality of holding lugs 73 are secured to the spider, one for each finger 72, and each supports a threaded bolt 74 which is adjustable to position the fingers 72. The fingers 72 are provided with rounded end portions adapted to seat in the outer annular recess of the locking ring 31. The spider 68 is positioned so that the fingers extend forwardly of the machine and the spider at its rear end carries a shoe 75 which is adapted to seat on the rim and over the partially engaged portion of the locking ring 31 and the rim 29. The guide or gib 68 is adapted to be moved vertically upwardly and downwardly responsive to actuation of the piston in the cylinder 66 in a block 77 having a way 79 provided therein for the reception of the guide or gib 68. The head 77 is suitably mounted at the upper end of the C-shaped frame member 10 forwardly of the cylinders 45. A motor driven compressor 80 of known construction and illustrated diagrammatically in the drawings is provided with an outlet for fluid under pressure. A conduit 81 leads from the outlet to a valve 82. A conduit 83 extends from the valve 82 and is adapted to conduct fluid under pressure to the upper end of the cylinder 66. A second conduit 84 extends from the valve 82 and leads to the lower end of the cylinder 66 for admitting fluid under pressure thereinto for raising the piston therein. A valve operating handle 85 is disposed forwardly of the machine and is connected to the valve operating mechanism in the valve 82 which is adapted to be conditioned by actuation of the handle 85 to cause fluid under pressure to be conducted from the compressor through the conduit 81 and the conduit 83 to the upper end of the cylinder 66 to force the piston rod 67 and the spider 69 downwardly with considerable force. Upon the downstroke of the piston rod 67 the shoe 75 seats upon the partially engaged portion of the locking rim 29 and the ring 31 as aforesaid and fulcrums about the ring so that the fingers 72 radially expand the ring 31 and force it downwardly to complete the engagement of the locking ring with the rim.

In Figure 3 it will be seen that the intermediate finger 72 is of slightly less length than the fingers 72 disposed at either side thereof and this intermediate finger preferably acts as a guide, there being no substantial force applied by the intermediate finger to the rim. Also, as shown in Figure 3 in dotted lines, the ring 31 is provided with clearance cuts 86 to facilitate assembly of the ring to the rim of the wheel. The ring 31 is further provided with a screw driver notch 87 to aid in manually disassembling the ring from the rim. In connection with the motor compressor 80 it will be seen that a return conduit 88 extends from the lower end of the valve 82 to return fluid to the sump 89 of the compressor. Manipulation of the valve handle 85 is adapted to admit fluid under pressure from the valve 82 through the conduit 83 to the upper end of the cylinder 66 to apply pressure to the locking ring, as described above, or to admit pressure to the conduit 84 which extends to the lower end of the cylinder 66 to raise the spider after completion of the final assembling operation of the ring with the rim. The valve 82 is of a character so that upon the alternate admission of pressure to the upper and lower ends of the cylinder 66 fluid from below and above the piston respectively in the cylinder 66 is alternately discharged through the valve 82 through the conduit 88 to the sump 89 of the compressor 80.

It will thus be observed that the apparatus of the present invention has three states of operation. The first operation comprises the positioning of the rim upon the platform 11 of the apparatus with respect to the apparatus controlled or operated by means of the cylinders 45 and the cylinders 66. Thereafter, the operator, by suitably manipulating the valve 41, may cause partial engagement of the locking ring with the rim, and finally, actuation of the valve 82 completes the assembly of the locking ring with the rim. If desired, the three operations above noted may be carried out in the sequence referred to without lowering the locating pins or the rods 51 so that, if desired, the locating pins, the rods 51 and the spider 69 may all be returned simultaneously to their inoperative positions; or, if desired, the locating pins may be actuated and then returned to their inoperative position, the rods 51 may be actuated and returned to inoperative position and, finally, the hydraulically operable means for completing the assembly may be actuated and returned to its inoperative position. It will be readily seen, therefore, that the apparatus may be utilized in one or two different ways dependent upon the wishes of the operator of the machine.

While we have shown what we consider to be the preferred embodiment of our invention, it will be understood that various modifications or rearrangements may be made therein and that the details of construction may be widely varied without departing from the spirit and scope of our invention.

We claim:

1. In a machine for assembling a tire locking ring to the rim of a wheel, the combination of a frame comprising a platform for supporting said wheel in a horizontal plane, a pair of rods mounted for vertical movement upon said frame above said platform and adapted to apply force vertically downwardly upon said ring to fit a portion thereof over a portion of said rim, a spider mounted for vertical movement upon said frame above said platform including a plurality of radially extending fingers adapted to engage said ring to apply force thereto vertically downwardly and radially thereof to fit the remainder of said ring over said rim, and a plurality of locating pins mounted for vertical sliding movement in said platform for engaging the inner periphery of said rim for positioning said wheel in a predetermined position with respect to said rods and said spider.

2. In a machine for assembling a tire locking ring to a rim of a wheel, the combination of a frame comprising a platform for supporting said wheel in a horizontal plane, a pair of rods mounted for vertical movement upon said frame above said platform and adapted to apply force vertically downwardly upon said ring to fit a portion thereof over a portion of said rim, and a spider comprising a plurality of radially extending fingers and a shoe member, said spider being mounted for vertical movement upon said frame above said platform and being adapted to be actuated for engaging said shoe with said rim to cause said fingers to engage said ring to apply force vertically downwardly thereto and radially thereof to fit the remainder of said ring over said rim.

3. In a machine for assembling a tire locking ring to the rim of a wheel, the combination of a frame comprising a platform for supporting said wheel in a horizontal plane, a pair of rods mounted for vertical movement upon said frame above said platform and adapted to apply force vertically downwardly upon said ring to fit a portion thereof over a portion of said rim, a spider comprising a plurality of radially extending fingers and a shoe member, said spider being mounted for vertical movement upon said frame above said platform and being adapted to be actuated for engaging said shoe with said rim to cause said fingers to engage said ring to apply force vertically downwardly thereto and radially thereof to fit the remainder of said ring over said rim, and a plurality of locating pins mounted for vertical sliding movement in said platform for engaging the inner periphery of said rim for positioning said wheel in a predetermined position with respect to said rods and said spider.

4. In a machine for assembling a tire locking ring to the rim of a wheel, the combination of a frame comprising a platform for supporting said wheel in a horizontal plane, a pair of rods mounted for vertical movement upon said frame above said platform, pneumatic means for moving said rods downwardly to engage said ring and apply force thereto to fit a portion thereof over said rim, a spider mounted for vertical movement upon said frame above said platform, said spider comprising a plurality of radially extending fingers, and hydraulic means for moving said spider vertically downwardly to cause the fingers to engage and apply force downwardly and radially of said ring to fit the remainder of said ring over said rim.

5. In a machine for assembling a tire locking ring to the rim of a wheel, the combination of a frame comprising a platform for supporting said wheel in a horizontal plane, a pair of rods mounted for vertical movement upon said frame above said platform, pneumatic means for moving said rods downwardly to engage said ring and apply force thereto to fit a portion thereof over said rim, a spider pivoted about a horizontal axis and comprising a plurality of radially extending fingers and a shoe member, said spider being mounted for vertical movement upon said frame above said platform, hydraulic means for moving said spider vertically downwardly to engage said shoe with said rim to cause said fingers to apply force vertically downwardly upon and radially of said ring to fit the remainder thereof over the rim.

6. In a machine for assembling a tire locking ring to the rim of a wheel, the combination of a frame comprising a platform for supporting said wheel in a horizontal plane, a pair of rods mounted for vertical movement upon said frame above said platform, pneumatic means for moving said rods downwardly to engage said ring and apply a force thereto to fit portion thereof over said rim, a spider mounted for vertical movement upon said frame above said platform, said spider comprising a plurality of radially extending fingers, hydraulic means for moving said spider vertically downwardly to cause said fingers to engage and apply force downwardly and radially of said ring to fit the remainder of said ring over said rim, and a plurality of positioning elements vertically slidable in said platform, and pneumatically operable means for raising said positioning elements vertically upwardly to position said wheel in a predetermined position with respect to said rods and said spider.

7. In a machine for assembling a tire locking ring to the rim of a wheel, the combination of a frame comprising a platform for supporting said wheel in a horizontal plane, a pair of rods mounted for vertical movement upon said frame above said platform, pneumatic means for moving said rods downwardly to engage said ring and apply force thereto to fit a portion thereof over said rim, a spider pivoted about a horizontal axis and comprising a plurality of radially extending fingers and a shoe member, said spider being mounted for vertical movement upon said frame above said platform, hydraulic means for moving said spider vertically downwardly to engage said shoe with said rim to cause said fingers to apply force vertically downwardly and radially to said ring to fit the remainder thereof over the rim, a plurality of locating pins vertically slidable in said platform, and pneumatically operable means for raising said centering pins vertically upwardly above said platform for engaging the inner periphery of said rim for positioning the same in a predetermined position with respect to said rods and said spider.

8. In a machine for assembling a tire locking ring to the rim of a wheel, the combination of means adapted to apply force to a part of said ring in a direction towards said wheel to engage said part of said ring over a portion of said rim, a spider having a shoe adapted to contact the engaged portion of said rim and ring, said spider having a plurality of fingers lying in planes extending substantially radially of the axis of rotation of the wheel, said fingers being adapted to engage portions of the remaining part of said ring, and means for applying force to said spider in a direction towards said wheel to cause said fingers to radially expand said ring to fit the remaining part thereof over said rim.

9. The combination of claim 8, characterized by the provision of a platform for supporting said wheel and means for positioning said wheel with respect to said platform in a predetermined position with respect to said first named means and to said spider.

ALBERT H. RERICK.
EARL B. RAUSCH.